(12) United States Patent
Duncan et al.

(10) Patent No.: US 8,913,859 B1
(45) Date of Patent: Dec. 16, 2014

(54) SEGMENTED PLANAR IMAGING DETECTOR FOR ELECTRO-OPTIC RECONNAISSANCE

(75) Inventors: Alan L. Duncan, Sunnyvale, CA (US); Richard Lee Kendrick, San Mateo, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 237 days.

(21) Appl. No.: 13/443,828

(22) Filed: Apr. 10, 2012

Related U.S. Application Data

(60) Provisional application No. 61/474,668, filed on Apr. 12, 2011.

(51) Int. Cl.
*G02B 6/32* (2006.01)

(52) U.S. Cl.
USPC .............................. 385/33; 385/12; 356/477

(58) Field of Classification Search
USPC ........................................ 385/33, 12; 356/477
See application file for complete search history.

(56) References Cited

U.S. PATENT DOCUMENTS

| | | | | |
|---|---|---|---|---|
| 4,952,042 A | * | 8/1990 | Pinson | 359/429 |
| 5,107,351 A | * | 4/1992 | Leib et al. | 359/11 |
| 6,020,963 A | * | 2/2000 | DiMarzio | 356/491 |
| 7,339,170 B2 | * | 3/2008 | Deliwala | 250/351 |
| 7,557,929 B2 | * | 7/2009 | Fang-Yen et al. | 356/484 |
| 7,835,598 B2 | * | 11/2010 | Lopushansky et al. | 385/12 |
| 8,456,622 B1 | * | 6/2013 | Estes et al. | 356/73.1 |
| 2005/0058352 A1 | * | 3/2005 | Deliwala | 382/232 |
| 2011/0085173 A1 | * | 4/2011 | Waller et al. | 356/484 |

OTHER PUBLICATIONS

Zeng et al, "Integration of polymer microlens array at fiber bundle extremity by photopolymerization," Optics Express, vol. 19, N. 6, p. 4805, Mar. 11, 2011.*

(Continued)

*Primary Examiner* — Peter Radkowski
(74) *Attorney, Agent, or Firm* — McDermott Will & Emery LLP

(57) ABSTRACT

A device for interferometric imaging may comprise multiple optical elements arranged in a linear configuration. The device may also comprise multiple waveguide arrays (WGAs) each WGA of the multiple WGAs may include one or more WGs. Some of the WGs of each WGA of the multiple WGAs may be optically coupled to an optical element of the multiple optical elements. Each WG of a first WGA of the multiple WGAs is coupled to a first optical element of the multiple optical elements and is paired with a WG of a second WGA of the multiple WGAs that is coupled to second optical element of the multiple optical elements. The lengths of the paired WGs of the first and second WGAs of the multiple WGAs are not equal.

20 Claims, 7 Drawing Sheets

(56) References Cited

OTHER PUBLICATIONS

Chen, et al., "High performance germanium photodetectors integrated on submicron silicon waveguides by low temperature wafer bonding", Optics Express, Jul. 21, 2008, vol. 16, Issue 15.

Cassan, et al., "On-Chip Optical Interconnects With Compact and Low-Loss Light Distribution in Silicon-on-Insulator Rib Waveguides", IEEE Journal of Selected Topics in Quantum Electronics, Mar./Apr. 2003, vol. 9, No. 2.

Ding, et al., "OIL: A Nano-photonics Optical Interconnect Library for a New Photonic Networks-on-Chip Architecture", Proceedings of the 11th International Workshop on System-Level Interconnect Prediction, Jul. 26-27, 2009.

Baehr-Jones, et al., "Silicon-on-sapphire integrated waveguides for the mid-infrared", Optics Express, May 24, 2010, vol. 18, Issue 12.

Hsiao, et al., "An infrared integrated optic astronomical beam combiner for stellar interferometry at 3-4 μm", Optics Express, Oct. 12, 2009, vol. 17, Issue 21.

Takahata, et al., "A wide wavelength range optical switch using a flexible photonic crystal waveguide and silicon rods", J. Micromech. Microeng., 2010, vol. 20.

* cited by examiner

SEGMENTED PLANAR IMAGING DETECTOR FOR ELECTRO-OPTIC RECONNAISSANCE

CROSS-REFERENCE TO RELATED APPLICATIONS

This application claims the benefit of priority under 35 U.S.C. §119 from U.S. Provisional Patent Application 61/474,668 filed Apr. 12, 2011, which is incorporated herein by reference in its entirety.

STATEMENT REGARDING FEDERALLY SPONSORED RESEARCH OR DEVELOPMENT

Not applicable.

FIELD OF THE INVENTION

The present invention generally relates to optical sensors, and more particularly to segmented planar electro-optical reconnaissance imaging detectors.

BACKGROUND

Many new sensor platforms, such as the Defense Advanced Research Projects Agency (DARPA) Vulture, are being developed. The Vulture is a high altitude, long endurance unmanned aerial vehicle (UAV) that may be used for surveillance. The sensor platforms may require electro-optic (EO) imaging sensors with very low mass and power requirements and may also have very constrained volume requirements (e.g., they may need to conform primarily to large planar wing surfaces). Conventional EO imaging sensors are unable to meet these constraints without severely limiting their capability (e.g., high resolution imagery capabilities). Space-based space surveillance (SBSS) satellites developed for space situational awareness missions may be too expensive to build and operate.

As a result, there is a need for a lower cost EO sensor that can still provide high resolution imagery. There is also a need for affordable EO sensor systems that can meet wide angle search requirements. These more affordable means may have reduced mass and volume, and use less power while still achieving moderate to large apertures.

SUMMARY

In some aspects, a device for interferometric imaging is described. The device may comprise multiple optical elements arranged in a linear configuration. The device may also comprise multiple waveguide arrays (WGAs). Each WGA of the multiple WGAs may include one or more WGs. Some of the WGs of each WGA of the multiple WGAs may be optically coupled to an optical element of the multiple optical elements. Each WG of a first WGA of the multiple WGAs is coupled to a first optical element of the multiple optical elements and is paired with a WG of a second WGA of the multiple WGAs that is coupled to second optical element of the multiple optical elements. The lengths of the paired WGs of the first and second WGAs of the multiple WGAs are not equal.

In another aspect, an apparatus for interferometric imaging is described. The apparatus may comprise multiple sensor arrays and a processing module configured to process optical signals receivable from the plurality of sensor arrays. The sensor array may comprise multiple optical elements arranged in a linear configuration. The sensor array may further comprise multiple WGAs, each including one or more WGs. Some of the WGs of each WGA of the multiple WGAs may be optically coupled to an optical element of the plurality of optical elements. Each WG of a first WGA of the multiple WGAs is coupled to a first optical element of the multiple optical elements, and is paired with a WG of a second WGA of the multiple WGAs that is coupled to a second optical element of the multiple optical elements. The lengths of the paired WGs of the first and second WGAs of the multiple WGAs are not equal.

In yet another aspect, a method for constructing an interferometric imaging apparatus is described. The method may comprise arranging multiple optical elements in a linear configuration to form a sensor array. The method may further comprise coupling multiple WGAs to the sensor array. Each WGA may comprise one or more WGs. Some of the WGs of each WGA of the multiple WGAs may be coupled to an optical element of the multiple optical elements. Each WG of a first WGA of the multiple WGAs may be coupled to a first optical element of a pair of optical elements of the plurality of optical elements. Each WG of a second WGA of the multiple WGAs to a second optical element of the pair of optical elements of the multiple optical elements. The length of the WGs of the first WGA of the multiple WGAs is not equal to the length of the WGs of the second WGA of the multiple WGAs.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

Figure 1:
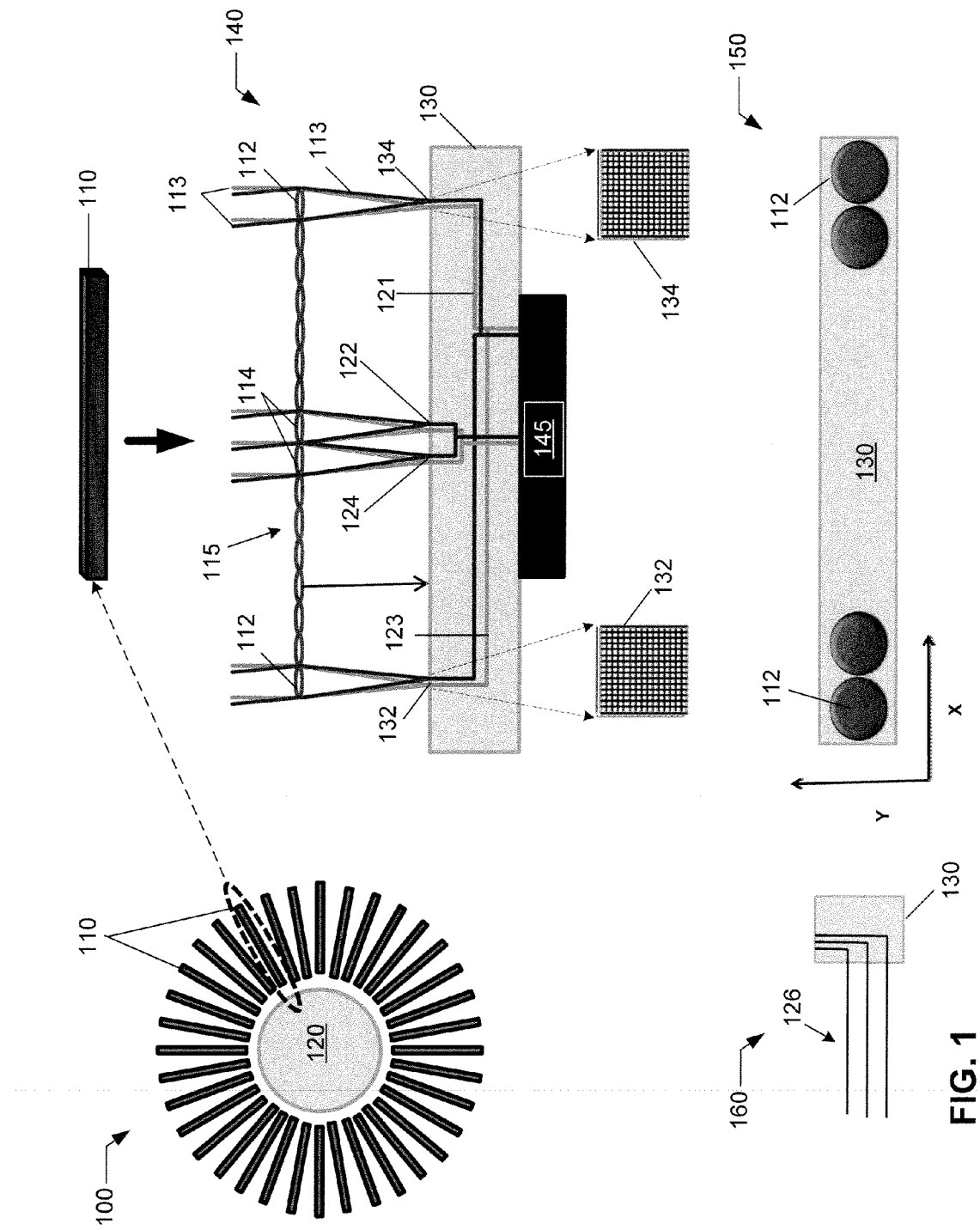
FIG. 1 is a conceptual diagram illustrating an example apparatus for interferometric imaging, according to certain aspects.

The present disclosure is directed, in part, to a device for interferometric imaging. The device may comprise multiple optical elements (e.g., lenslets) arranged in a linear configuration. The device may also comprise multiple waveguide arrays (WGAs). Each WGA may include one or more WGs. Some of the WGs of each WGA may be optically coupled to an optical element. Each WG of a first WGA is coupled to a first optical element of the multiple optical elements, and is paired with a WG of a second WGA of the multiple WGAs that is coupled to a second optical element of the multiple optical elements. The lengths of the paired WGs of the first and second WGAs of the multiple WGAs are not equal.

In one aspect, an apparatus for interferometric imaging may comprise multiple sensor arrays and a processing module configured to process optical signals receivable from the plurality of sensor arrays. The sensor array may comprise multiple optical elements arranged in a linear configuration. The sensor array may further comprise multiple WGAs, each including one or more WGs. Some of the WGs of each WGA may be optically coupled to an optical element of the multiple optical elements. Each WG of a first WGA of the multiple WGAs is coupled to a first optical element of the multiple optical elements and is paired with a WG of a second WGA of the multiple WGAs that is coupled to second optical element of the multiple optical elements. The lengths of the paired WGs of the first and second WGAs of the multiple WGAs are not equal.

According to various aspects of the subject technology, an imaging sensor that provides the performance capability needed by various missions in a radically compressed and low mass and power package is disclosed. According to one aspect, the imaging sensor is analogous in form to a flat panel television. According to various aspects of the subject technology, an optical imager that has lower size, weight, and power (SWAP) characteristics is disclosed. The optical imager may provide a solution for various mission needs at substantially lower cost. According to one aspect, the optical imager embodies an affordable EO imaging satellite.

According to various aspects of the subject technology, an imaging sensor may include a multiple baseline, direct detection interferometric imaging sensor. The imaging sensor may use nano-optics technology including micron scale waveguides, switches, phase modulators, beam combiners, and detectors on a silicon or other type of chips, formed by a large number (e.g., millions) of integrated optical interconnects, for detection of equivalent of many (e.g., hundreds of) megapixels of image data. The imaging sensor design may be modular so that the sensing elements may be arrayed in a planar disk or distributed on a large surface (e.g., a UAV wing structure). In one aspect, the imaging sensor may be a segmented planar imaging detector for electro-optical reconnaissance (SPIDER). The imaging sensor may also include computer chips that include a large number of (e.g., millions) of optical interconnects to increase speed and interconnect density on the chip.

FIG. 1 is a conceptual diagram illustrating an example apparatus 100 for interferometric imaging, according to certain aspects. Apparatus 100 may be a SPIDER including a large number of (e.g., thousands) sensor arrays 110 and one or more processing modules 120. Each sensor array 110 is a microwave interferometric imaging device including an array 115 of optical elements (e.g., lenslets), substrate 130 enclosing a number of WGAs (e.g., 132 or 134), and an optical processing module 140. The array 115 may be a linear array including a large number of (e.g., 100 or more) optical elements (e.g., 112 or 114) or, in one aspect, may include one or more linear arrays of optical elements. Each optical element may focus light rays to a number of WGs, such as the wave guides of a WGA. For example, optical element 112 may concentrate light rays 113 to the WGA 134. The WGs of each WGA may have vertical and horizontal paths (e.g. 121) in substrate 130.

As shown in the cross sectional view 140 of sensor array 110, the array 115 of optical elements may be positioned at a distance (e.g., the focal length of lenslets, for example, 1 cm) from the substrate 130. In one aspect, the sensor array 110 may be integrated into the substrate 130 and even formed on or built into the substrate 130 (e.g., including a transparent material such as glass or transparent polymers). Lenslets of the sensor array 110 may typically have the same features such as the same size (e.g., 1 mm diameter), the same focal length (e.g., 1 cm), and equal F-stop values (e.g., f/10). In some aspects, the lenslets of the sensor array 110 may have features that are not the same. Substrate 130 may be a silicon substrate. In some aspects, substrates based on other semiconductor materials can also be used.

In order to enable interferometric imaging, the optical elements may be used in pairs. For example, optical elements 112 may form a pair and optical elements 114 may form another pair. In an aspect, for an N-element sensor array with element numbers 1, 2, 3 . . . N, optical element pairs such as (1, N), (2, N−1), (3, N−2) and the like, may be formed, although other pairing arrangements may also be used. Each pair of optical elements may be coupled to a respective pair of WGAs. For example, as shown in FIG. 1, optical elements pair 112 are coupled to a pair of WGAs, i.e., 132 and 134 (which are also shown in exploded view), and optical elements pair 114 is coupled to another pair of WGAs, i.e., 122 and 124.

Still refereeing to FIG. 1, it is important to note that WGs of a pair of WGAs, such as WGs 121 and 123 of WGAs 132 and 134, respectively, have different path length in substrate 130 before the point where they are combined to enter optical processor 145. It is understood that WGAs such as WGAs 132 and 134 may include a large number (e.g., 200×200) of WGs (e.g., silicon on insulator (SOI) WGs) with a few μm (e.g., 5 μm) channel size, but for simplicity, only one WG (e.g., 121 and 123) of each WGA are shown. Although each WGA (e.g., WGA 132) is coupled to a lenslet (e.g., lenslet 112), but each WG of the WGA may view the lenslet at a different view angle, and therefore may have a unique contribution to forming an image. As seen in side view 140, WGs of WGAs (e.g., WGs 121 and 123) may travel vertically in one or more portion of their path. The difference in path length of the pair of WGs results in a phase difference which is utilized by a correlator of an optical processor 145 to form an interferometric image.

The output optical signals from optical processor 145 may couple to some external waveguide (e.g., 126 in end view 160), such as optical fibers, before finally coupling to processing module 120. In some aspects, optical processor 145 may include one or more opto-electronic processors and generate electrical output signals. Optical processor 145 may be integrated with the substrate 130 either by forming optical processor 145 over substrate 130 or via packaging. Processing module 120 may include optical, opto-electronic, and electronic processing circuits and devices. Other hardware such as memory, firmware, as well as software may also be embedded in processing module 120. In an aspect, the entire SPIDER 100 may be fabricated on a single chip (e.g., a 45 cm diameter silicon chip).

Figure 2:
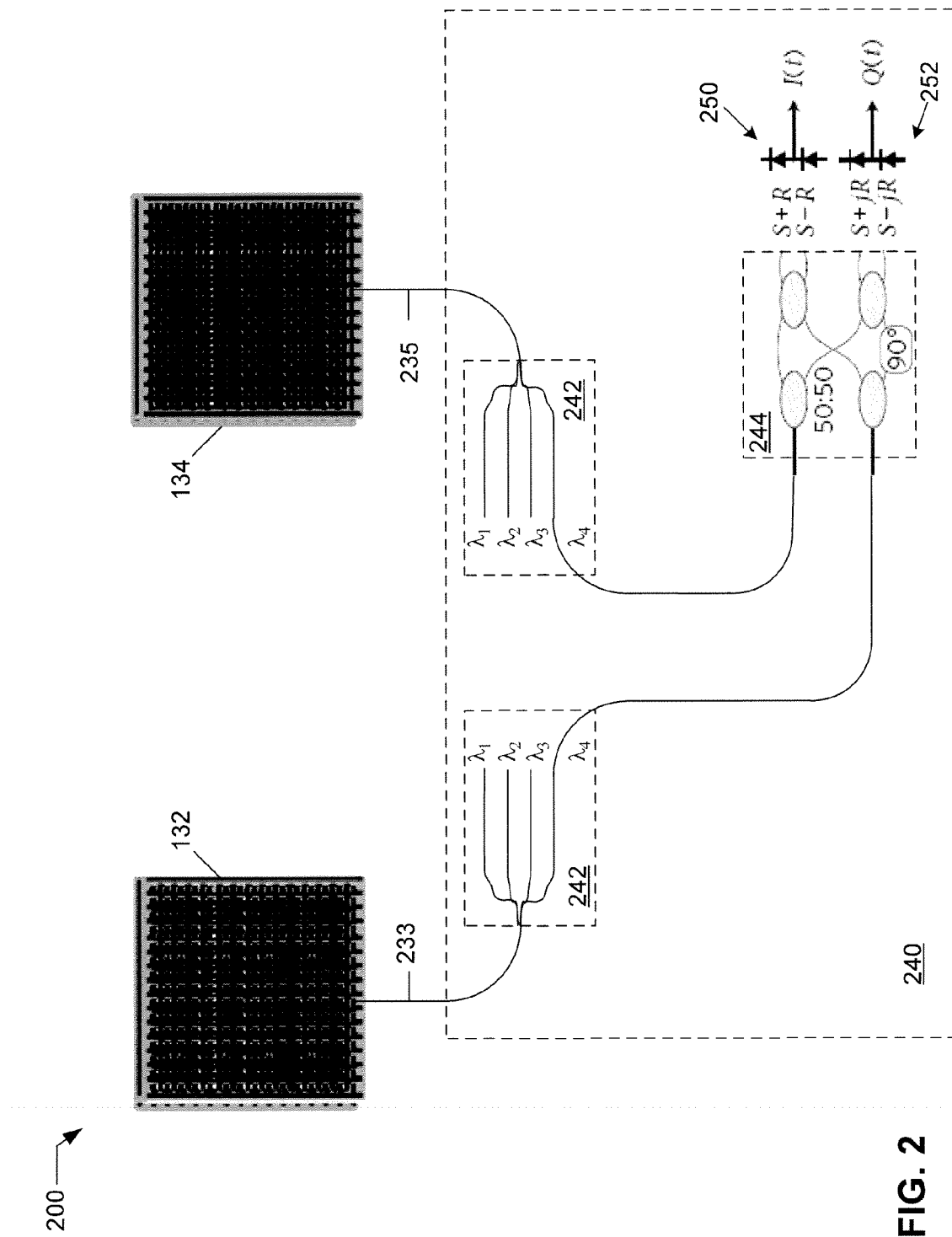
FIG. 2 is a conceptual diagram illustrating example waveguide arrays coupled to an optical processing module of the apparatus of FIG. 1, according to certain aspects.

FIG. 2 is a conceptual diagram illustrating example waveguide arrays 132 and 134 coupled to an optical processor 245, according to certain aspects. The optical processor 245 is an embodiment of optical processor 145 of FIG. 1. Example pair of WGs 233 and 235 of WGAs 132 and 134 is coupled to optical processor 245. Optical processor 245 may include a number of optical processing sub-modules, for example, demultiplexers (demux) 242, optical quadrature modulator 244, and detectors 250 and 252. Demux 242 may disperse optical signals from WGs 233 and 235 into multiple spectral bins (e.g., with wavelength $\lambda_1$, $\lambda_2$, $\lambda_3$, $\lambda_4$). The dispersed signals may be processed, for example, in an optical quadrature modulator 244, and converted to electrical in-phase (I) and quadrature (Q) signal by the detectors (e.g., photodiodes) 250 and 252. The I and Q signals may be further processed by the optical processor 245 (further processing not shown for simplicity) or sent to processing module 120 of FIG. 1.

Figure 3A:
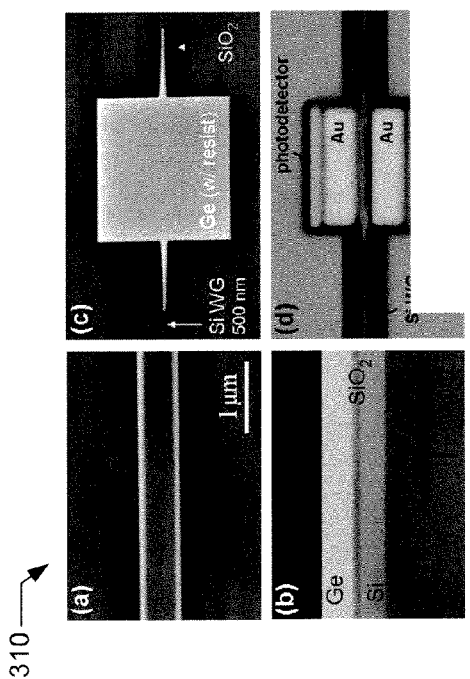
FIGS. 3A-3C are diagrams illustrating examples of optical devices included in the optical processing module of the apparatus of FIG. 1, according to certain aspects.
Figure 3C:
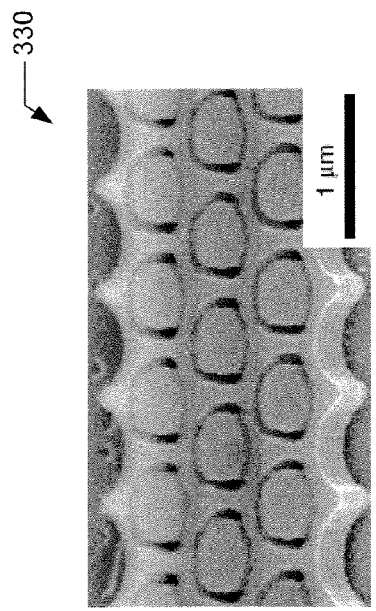
Figure 3B:
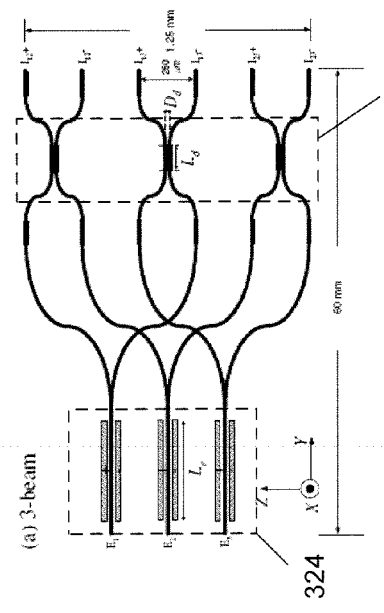

FIGS. 3A-3C are diagrams illustrating examples of optical devices 310, 320, and 330 included in the optical processing module of the apparatus of FIG. 1, according to certain aspects. Optical processor 145 or processing module 120 of FIG. 1 may include a number of optical sub-module and nano-photonic components, for example, optical detector, optical modulators, optical switches, optical combiners, and the like.

FIG. 3A shows scanning electron microscope (SEM) images of example on-chip optical detectors 310 that may be used by or integrated into the optical processor 145 and/or processing module 120. On-chip detectors may include known high performance germanium photo detectors integrated on submicron silicon WGs by low temperature bonding. In FIG. 3A, (a) is a SEM top view image of a silicon waveguide without cladding; (b) shows a SEM cross sectional image of an ion-cut Ge layer deposited on a Sio2 coated silicon substrate; and (c) depicts a SEM top view image of a Ge pad with tapers on top of the silicon waveguide; in (d) an optical image of a fabricated Ge photodetector before depositing contact pads is shown.

Beam combiners are also quite common in integrated-optic circuits and devices and may be used by optical processor 145 and/or processing module 120 in combination with photonic switches or splitters. FIG. 3B shows an example optical device 320 including a three-beam interferometric combiner 322, which is known to be applicable for operation in the L band. Interferometric combiner 322 may be integrated with other components such as on-chip Y-splitters 324 to perform interferometric processes.

Another useful components for optical processor 145 and/or processing module 120 are photonic switches. Wide wavelength range optical switches based on, for example, flexible photonic crystal waveguides and silicon rods are known. FIG. 3C shows a SEM image of a fabricated switch device 330, which may be actuated by electrostatic deflection. Switch device 330 may be a wideband (e.g., 90 nm) switch with a few µm scale that can enable substantially compact packaging.

Figure 4B:
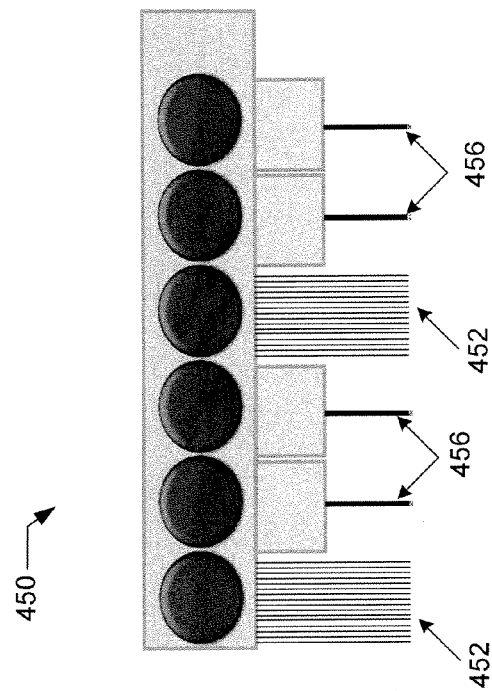
FIGS. 4A-4B are conceptual diagrams illustrating an example telescope for interferometric imaging and a sensor array of the telescope, according to certain aspects.
Figure 4A:
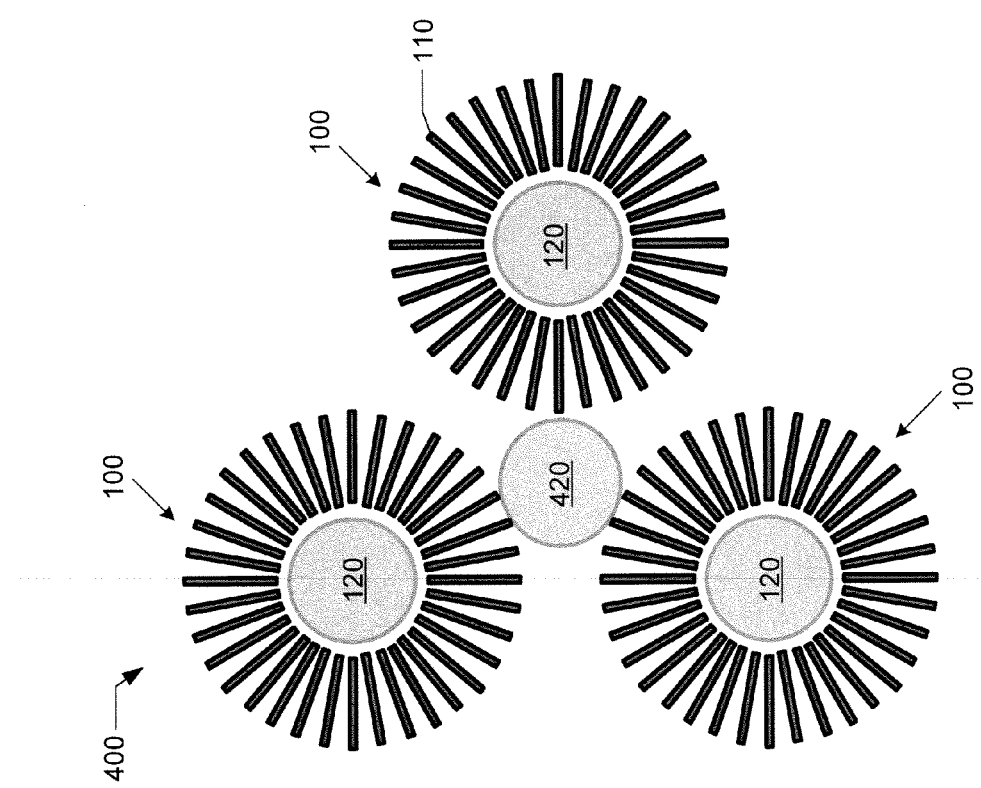

FIGS. 4A-4B are conceptual diagrams illustrating an example telescope 400 for interferometric imaging and a top view 450 of sensor array 110 of the telescope, according to certain aspects. A number of apparatus 100 (i.e., SPIDER) may be integrated to create a larger aperture (e.g. 1-2 m) planar telescope with a field of view (FOV) of more than five degrees. For example, telescope 400 is based on three SPIDERs 100 and includes a central processing core 420. Some or all of the sensor arrays 110 of SPIDERs 100 may be coupled to central processing core 420. The coupling of the sensor arrays 110 to the central processing core 420 may be through external optical coupling (e.g., via optical fibers).

In an aspect, as shown in the top view 450, every third lenslet of the sensor array 110 may be internally coupled through on chip waveguides 452 (e.g., SOI waveguide) to processing modules 120. Also, two-out-of-three lenslets of the sensor array 110 may be externally coupled through, for example, optical fibers 456 to processing core 420. Processing core 420 may include, but is not limited to, one or more optical and/or electronic processors, memory, radio transceivers, power modules, and other hardware, firmware, and software modules. Processor core 420 may perform complex image processing to generate high resolution images with sufficient signal-to-noise (SNR) to support video rate imaging. Low mass and power, large surface area, planar (e.g., 2 cm thickness), modularity of design, and high resolution are among the features of telescope 400 that make this telescope attractive for wide area electro-optical surveillance from high altitude, for example, for application on long endurance UAVs or small satellite constellations. Telescope 400 may achieve a high resolution of approximately 15 cm and cover a field of view of 3 km by 3 km at 25 km range.

Figure 5:
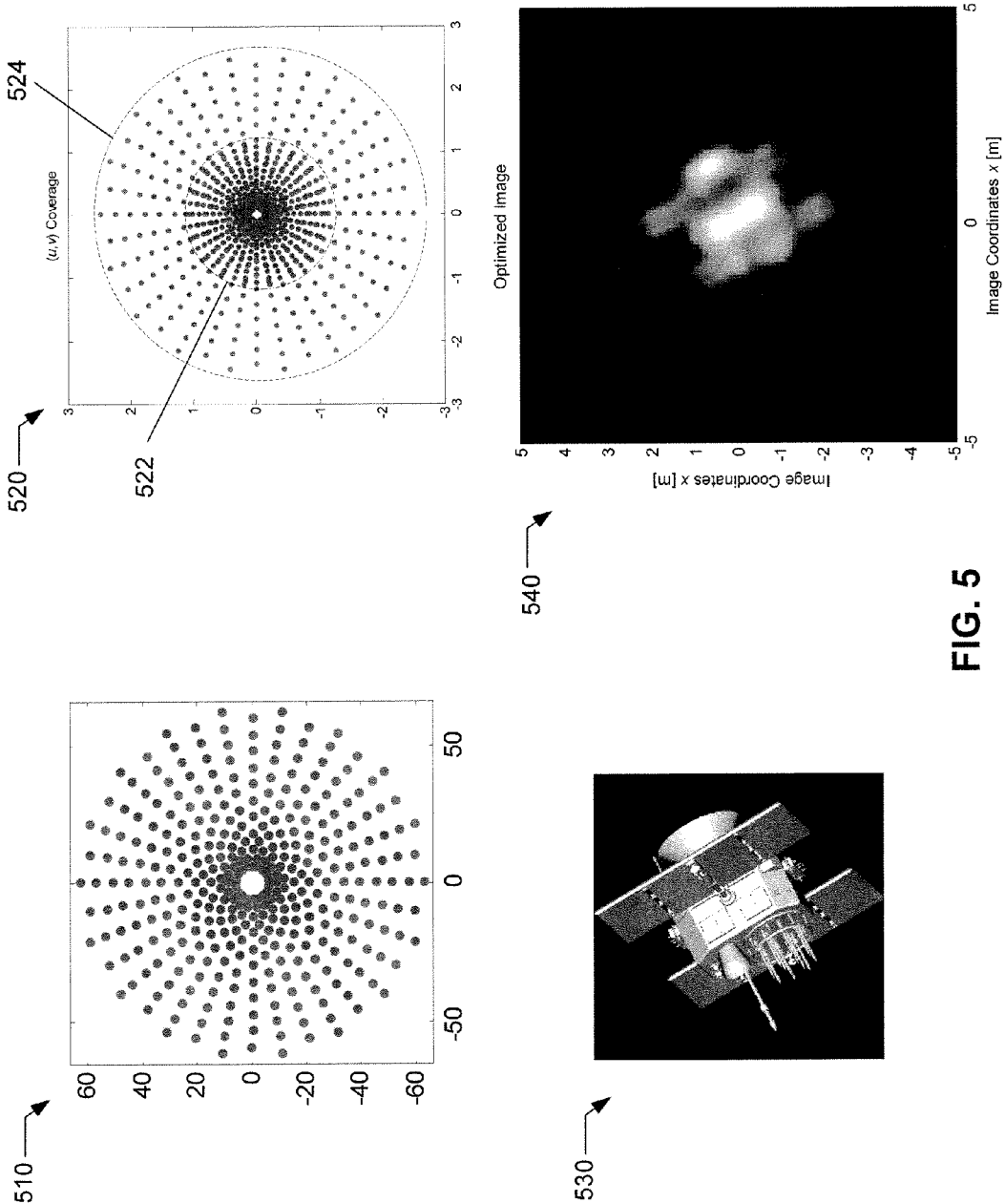
FIG. 5 shows diagrams illustrating examples of imaging features of the apparatus of FIG. 1, according to certain aspects.

FIG. 5 shows diagrams illustrating examples of imaging features of the apparatus 100 of FIG. 1, according to certain aspects. Unconventional imaging solutions such as direct stellar interferometry and intensity correlation interferometry are complex and may require long integration times to form images (e.g., a few hours to a few weeks). However, the optical imager disclosed (e.g., apparatus 100) may collect images at video rates since the optical imager may not require reconfiguring a conventional interferometer array or waiting for the earth's rotation to fill the u, v plane. The subject optical imager has a spoked-wheel structure, with multiple sensor arrays 110 of FIG. 1 radiating from a central ring, which provide a spoked-wheel aperture geometry diagram 510. Each dot on each spoke of the aperture geometry diagram 510 may correspond to a sensor of a sensor array 110.

The aperture geometry 510, after transformation from two-dimensional spatial domain (e.g., (x,y) or ($\rho,\theta$) space) to spatial-frequency domain (e.g. two-dimensional (u,v) space) may result in a spectral diagram 520. In spectral diagram 520, circles 522 and 524 separate two spectral regions. The inner region (e.g., inside circle 522) corresponds to lower spatial frequencies (i.e., longer wavelengths), whereas the area between circles 522 and 524 corresponds to higher spatial frequencies (i.e., shorter wavelengths). For the example of multiple spectral bins (e.g., with wavelengths $\lambda_1$, $\lambda_2$, $\lambda_3$, $\lambda_4$) shown in FIG. 2, a respective spectral diagram may include four distinct regions corresponding to wavelengths $\lambda_1$, $\lambda_2$, $\lambda_3$, $\lambda_4$, which makes the diagram denser. A denser diagram may result in a higher resolution image. For example, image 540 is an image of the object 530 constructed using an optical processor with multiple spectral bins (e.g., 4 bins). Each (u,v) point in the spectral diagram may correspond to a difference in phase between two points (e.g., difference in phase between signals of a pair of WGs (e.g., 121 and 123 of FIG. 1). An image (e.g., f(x,y)) may be restored by performing an inverse Fourier transform on the spectral diagram which is a function of u and v (i.e. f(v, u)).

Figure 6:
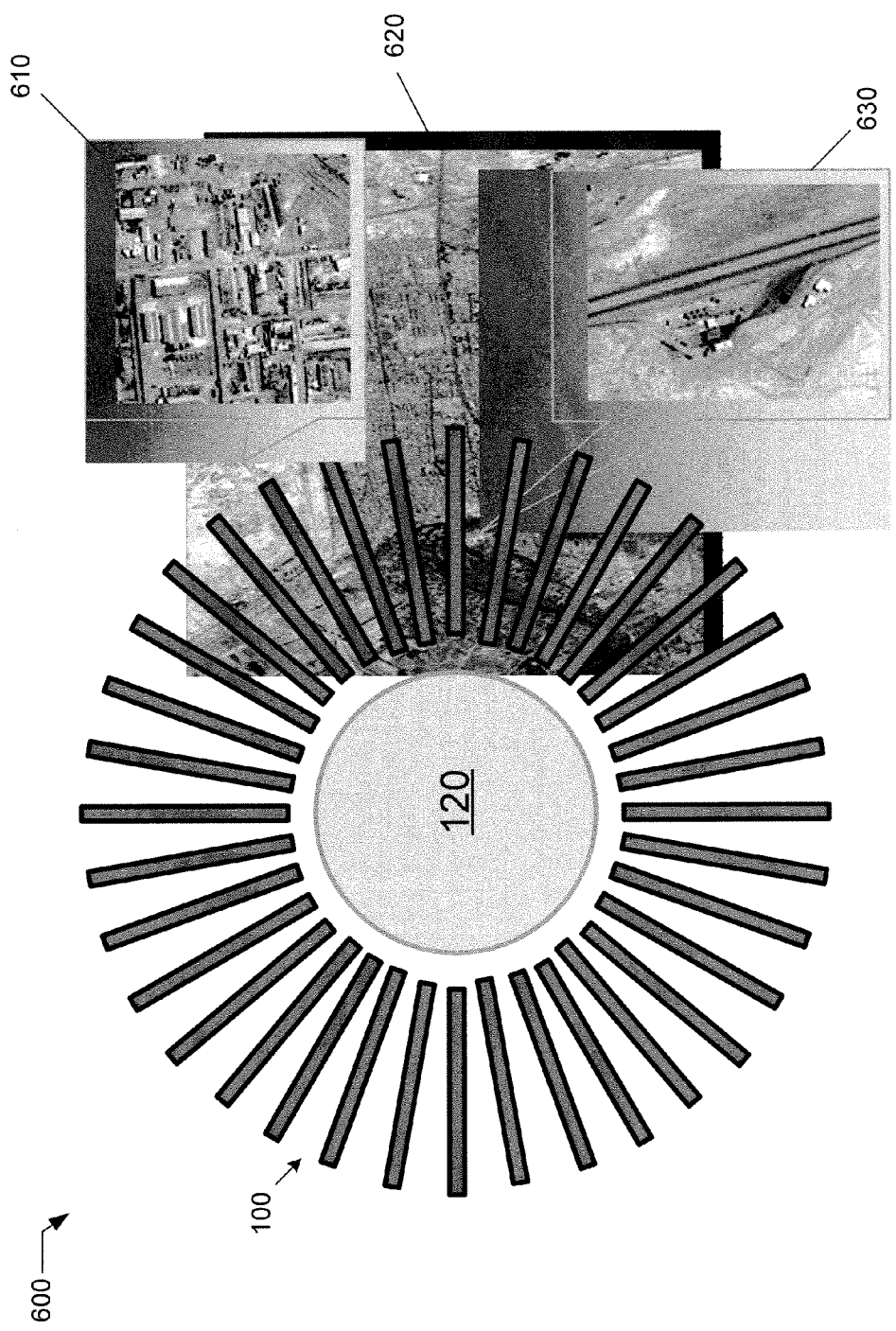
FIG. 6 is a diagram illustrating example images captured by the apparatus of FIG. 1, according to certain aspects.

FIG. 6 is a diagram illustrating example images captured by the apparatus 100 of FIG. 1, according to certain aspects. Apparatus 100 (i.e., SPIDER) is a high resolution imager that can provide images with a large number of pixels (e.g., 400 M pixel) and pointing jitter requirement of approximately 0.5 mrad. SPIDER 100, with a large aperture (e.g., 30 cm) may be used in wide area persistent surveillance and is capable of producing images of multiple high resolution targets such as high resolution images 610, 620, and 630 that show coverage of a large field of view at various zoom levels. SPIDER 100 is a hyperspectral enabled camera that may cover a wide range of spectrum from short-wave infrared (SWIR) to medium-wave infrared (MWIR). SPIDER 100 may be able to access a large area at any time for as long at it may take to identify and characterize targets of interest. As a persistent surveillance imager, SPIDER 100 is enabled to look at the right target, at the right time, periodically and at a rate sufficient to reconstruct temporal event(s) of interest for sufficient period. SPIDER 100 has a scanner which can detect/observe the phenomenon, i.e., can read the right part of the spectrum and is sufficiently sensitive to determine the target's attributes.

Figure 7:
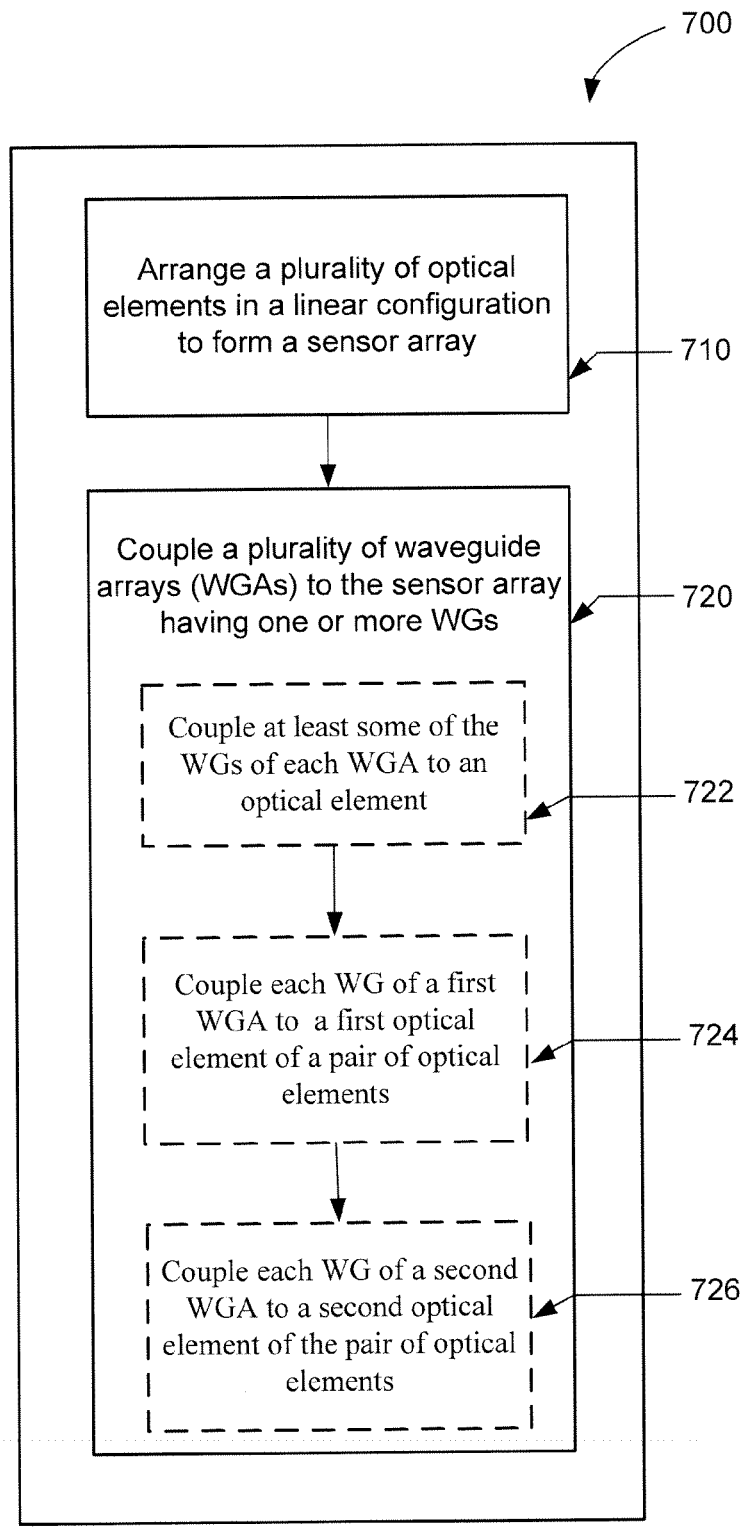
FIG. 7 is a flow diagram illustrating an example method for constructing the interferometric imaging apparatus of FIG. 1, according to certain aspects.

FIG. 7 is a flow diagram illustrating an example method 700 for constructing the interferometric imaging apparatus of FIG. 1, according to certain aspects. Method 700 begins at operation 710, where multiple optical elements (e.g., lenslets 112 and 114 of FIG. 1) in a linear configuration to form a sensor array (e.g., sensor array 115 of FIG. 1). Multiple WGAs (e.g., WGAs 132 and 134 of FIG. 1) to the sensor array (operation 720). Each WGA may comprise one or more WGs (e.g., WGs 121 and 123 of FIG. 1). Some of the WGs of each WGA of the multiple WGAs may be coupled to an optical element of the multiple optical elements (operation 722). Each WG (e.g., WG 121 of FIG. 1) of a first WGA (e.g., WGA 132 of FIG. 1) of the multiple WGAs may be coupled to a first optical element of a pair of optical elements (e.g., 112 of FIG. 1) of the plurality of optical elements (e.g., 115 of FIG. 1). Each WG (e.g., WG 123 of FIG. 1) of a second WGA (e.g., WGA 132 of FIG. 1) of the multiple WGAs to a second optical element of the pair of optical elements (e.g., 112 of FIG. 1) of the multiple optical elements. The length of the WGs (e.g., WG 121 of FIG. 1) of the first WGA of the multiple WGAs is not equal to the length of the WGs (e.g., WG 123 of FIG. 1) of the second WGA of the multiple WGAs.

In some aspects, the subject technology is related to advanced sensors, optical components, photonics and optical computing, information fusion, nano-photonics, electro-optical (EO) sensors, unmanned aerial vehicles, space situational awareness, persistent surveillance, reconnaissance, imaging, fiber coupled interferometers, synthetic apertures, and low size, weight, and power requirements. In some aspects, the subject technology may be used in various markets, including for example and without limitation, aerospace markets, electro-optical sensor markets, and optical and imaging markets.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range is specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A device for interferometric imaging, the device comprising:
    a plurality of optical elements arranged in a linear configuration; and
    a plurality of waveguide arrays (WGAs), each WGA comprising one or more WGs, wherein at least some of the WGs of each WGA of the plurality of WGAs are optically coupled to an optical element of the plurality of optical elements,
    wherein each WG of a first WGA of the plurality of WGAs is coupled to a first optical element of the plurality of optical elements and is paired with a WG of a second WGA of the plurality of WGAs that is coupled to a second optical element of the plurality of optical elements, and wherein the paired WGs of the first and second WGAs of the plurality of WGAs have vertical and horizontal paths with non-equal path lengths in a substrate.

2. The device of claim 1, wherein the plurality of optical elements comprise a plurality of a lenslet, and wherein each lenslet is adapted to focus light into a WGA of the plurality of WGAs.

3. The device of claim 1, wherein each WG of the WGA of the plurality of WGAs views the corresponding optical element coupled to that WG at a different view angle.

4. The device of claim 1, wherein the plurality of waveguide arrays are fabricated in the substrate, and wherein the substrate comprises at least one of a glass or a semiconductor material.

5. The device of claim 1, wherein the plurality of WGAs are adapted to couple the light collected by the plurality of optical elements to an optical processing module, wherein the optical processing module in integrated with the plurality of WGAs, and wherein one or more portions of a path of each WG of the plurality of WGAs is in vertical direction.

6. The device of claim 5, wherein optical signals from the two WGs of each paired WGs of the first and second WGAs of the plurality of WGAs are combined where coupling to the optical processing module.

7. The device of claim 5, wherein the two WGs of each paired WGs of the first and second WGAs form an interferometer and can sample an object of interest at high special frequencies and is adapted to measure a visibility amplitude and phase in the pupil plane.

8. The device of claim 5, wherein the optical processing module is configured to disperse the light signals from each of the two WGs of each paired WGs of the first and second WGAs into a number of spectral bins having different wavelengths, and wherein spectral bins, corresponding to the same wavelength, from the two WGs of each paired WGs of the first and second WGAs are separately combined by the optical processing module.

9. The device of claim 5, wherein the optical processing module comprises at least one of optical switches, phase modulators, beam combiners, or detectors.

10. The device of claim 1, wherein the device is a member of an array of devices integrated to form an imaging array, and wherein the devices in the imaging array share an optical processing module.

11. The device of claim 10, wherein the imaging array forms a planar disk, and wherein the imaging array is a low mass, low volume, low power, and high resolution array and meets wide angle search requirements.

12. The device of claim 10, wherein the imaging array is adapted to collect images at video rates and is further adapted for use in stellar interferometry and intensity correlation interferometry.

13. An apparatus for interferometric imaging, the apparatus comprising:
a plurality of sensor arrays; and
a processing module configured to process optical signals receivable from the plurality of sensor arrays,
wherein the sensor array comprises:
a plurality of optical elements arranged in a linear configuration; and
a plurality of waveguide arrays (WGAs), each WGA comprising one or more WGs, wherein at least some of the WGs of each WGA of the plurality of WGAs are optically coupled to an optical element of the plurality of optical elements,
wherein each WG of a first WGA of the plurality of WGAs is coupled to a first optical element of the plurality of optical elements and is paired with a WG of a second WGA of the plurality of WGAs that is coupled to a second optical element of the plurality of optical elements, and wherein the paired WGs of the first and second WGAs of the plurality of WGAs have vertical and horizontal paths with non-equal path lengths in a substrate.

14. The apparatus of claim 13, wherein the plurality of sensor arrays and the processing modules are arranged to form a planar disk, and wherein the apparatus is a low mass, low volume, low power, and high resolution array and meets wide angle search requirements.

15. The apparatus of claim 13, wherein the plurality of sensor arrays are adapted to collect images at video rates and the apparatus is adapted for use in stellar interferometry and intensity correlation interferometry.

16. The apparatus of claim 13, wherein the processing module is an optical processing module and comprises at least one of optical switches, phase modulators, beam combiners, or detectors.

17. The apparatus of claim 13, wherein the plurality of optical elements comprises a plurality of a lenslet, and wherein each lenslet is adapted to focus light into a WGA of the plurality of WGAs, and wherein each WG of the WGA of the plurality of WGAs views the corresponding optical element coupled to that WG at a different view angle.

18. The apparatus of claim 13, wherein the plurality of WGAs are adapted to couple the light collected by the plurality of optical elements to the processing module, and wherein optical signals from the two WGs of each paired WGs of the first and second WGAs are combined where coupling to the processing module.

19. The apparatus of claim 13, wherein the apparatus is a member of a telescope formed by a plurality of the same apparatuses and an external processing core, wherein each member of the telescope is configured to provide external electro-optical signals to the processing core.

20. The device of claim 1, wherein the plurality of optical elements are integrated with the substrate, wherein the plurality of optical elements are used in pairs to enable interferometry, and wherein each pair of optical elements of the plurality of optical elements may be coupled to a respective pair of WGAs.

* * * * *